US006188755B1

(12) United States Patent
Hayashi et al.

(10) Patent No.: US 6,188,755 B1
(45) Date of Patent: Feb. 13, 2001

(54) KEY TELEPHONE SYSTEM HAVING A PLURALITY OF TELEPHONE NUMBERS TO KEY TELEPHONE SET

(75) Inventors: Hiroaki Hayashi; Mariko Koyama, both of Tokyo (JP)

(73) Assignee: Kabushiki Kaisha Toshiba, Kawaski (JP)

( * ) Notice: Under 35 U.S.C. 154(b), the term of this patent shall be extended for 0 days.

(21) Appl. No.: 09/035,912

(22) Filed: Mar. 6, 1998

(30) Foreign Application Priority Data

Mar. 13, 1997 (JP) .................................... 9-058674
Mar. 28, 1997 (JP) .................................... 9-077338

(51) Int. Cl.$^7$ .................................................. H04M 1/00
(52) U.S. Cl. .......................... 379/156; 379/164; 379/165
(58) Field of Search .................................. 379/156, 164, 379/165

(56) References Cited

U.S. PATENT DOCUMENTS

| 4,802,206 | * | 1/1989 | Yoshida et al. | 379/158 |
|---|---|---|---|---|
| 4,850,012 | * | 7/1989 | Mehta et al. | 379/157 |
| 4,907,258 | * | 3/1990 | Kamitomo | 379/157 |
| 4,922,526 | * | 5/1990 | Morganstein et al. | 379/157 |
| 5,193,089 | * | 3/1993 | Tsuchida | 370/84 |
| 5,251,254 | * | 10/1993 | Tanigawa et al. | 379/165 |
| 5,463,676 | * | 10/1995 | Ohsawa | 379/67 |
| 5,471,523 | * | 11/1995 | Smith et al. | 379/165 |
| 5,483,584 | * | 1/1996 | Hayashi et al. | 379/156 |
| 5,650,932 | * | 3/1987 | Komuro et al. | 379/164 |
| 5,699,419 | * | 12/1997 | Ardon | 379/156 |
| 5,757,897 | * | 5/1998 | LaBarbera et al. | 379/165 |

FOREIGN PATENT DOCUMENTS 2-25146 * 1/1990 (JP) .
7-23436 * 1/1995 (JP) .
7-177231 * 7/1995 (JP) .
7-297920 * 11/1995 (JP) .

OTHER PUBLICATIONS

Patent Abstract of Japan, Publication No. 07297920A, dated Nov. 10, 1995.*
Patent Abstract of Japan, Publication No. 2–25146(A), dated Jan. 26, 1990.*
Patent Abstract of Japan, Publication No. 07177231A, dated Jul. 14, 1995.*
Patent Abstracts of Japanese Patent Publication No. 07–023436 A.
Patent Abstracts of Japanese Patent Publication No. 52–051805 A.

* cited by examiner

Primary Examiner—Paul Loomis
Assistant Examiner—Quoc Tran
(74) Attorney, Agent, or Firm—Finnegan, Henderson, Farabow, Garrett, & Dunner, L.L.P.

(57) ABSTRACT

This invention enables the key telephone system to send a busy tone to a party calling on a main extension number when a telephone call to the main extension number is received when a pseudo extension number is in use.

The receiving mode is memorized in the memory of the main unit. When a telephone call to the main extension number is received when the pseudo extension number is in use, a busy tone can be sent to the calling party on the main extension number.

According to this invention, the calling party thus knows that the key telephone set, which is the destination of his call, is busy.

31 Claims, 15 Drawing Sheets

| Caller number | Mode |
|---|---|
| A: 03-3728-○○○○ | RBT |
| B: 042-585-×××× | BT |
| C: 03-3701-△△△△ | BT |
| ⋮ | ⋮ |

Fig. 12

| Caller number | Mode | Priority |
|---|---|---|
| A: 03-3728-○○○○ | RBT | 1 |
| B: 042-585-×××× | RBT | 2 |
| C: 03-3701-△△△△ | RBT | 3 |
| ⋮ | ⋮ | ⋮ |

Fig. 13

KEY TELEPHONE SYSTEM HAVING A PLURALITY OF TELEPHONE NUMBERS TO KEY TELEPHONE SET

BACKGROUND OF THE INVENTION

1. Field of the Invention

This invention relates to the control of a telephone call received from a third person during a telephone call.

2. Description of the Related Art

In a key telephone system, a key telephone set is assigned a main extension number and a pseudo extension number. Here, the pseudo extension number is the number assigned to the main extension without a physical accommodation position and a key telephone set. For example, the main extension number of No. 200 is assigned to a key telephone set, as well as the pseudo extension numbers such as No. 500 and No. 501. These the pseudo extension numbers are also assigned to other key telephone sets. Although the user of this key telephone set can usually talk over the telephone by using the main extension number of No. 200, he can also talk over the telephone by using the pseudo extension numbers of No. 500 or No. 501.

Next, the call process using the main extension number of a conventional key telephone system is explained. If a telephone call to the main extension number is received in the key telephone system, the destination of the telephone call is determined by analyzing the telephone call based on the extension number. Next, the key telephone system judges whether the key telephone set of the main extension number is busy by using the extension number. If the key telephone set of this main extension number is not busy, a ring-back tone is sent to the caller. On the other hand, if the key telephone set of the main extension number is busy, a busy tone is sent to the caller. Therefore, when the main extension No. 200 on the key telephone set is busy, and a telephone call to that extension is received from an other caller, a busy tone is sent to that caller.

The caller then knows that the key telephone set, which is the destination, is busy, and will hang up the telephone.

On the other hand, if a telephone call to the main extension number is received from an other caller when the key telephone set is utilizing one of the pseudo-extensions, for example pseudo extension number of No. 500, the key telephone system judges that the key telephone set is not busy because the extension of No. 200 is idle. The key telephone system thus makes the key telephone set ring.

However, because the key telephone set is busy through use of the pseudo extension number No. 500 at this time, the user of the key telephone set cannot answer the telephone call coming in on main extension number No. 200. The key telephone set thus continues to ring. For this reason, the user of the key telephone set cannot continue the telephone call on the pseudo extension number calmly. Moreover, since the caller does not understand that the key telephone set is busy, he wastes time waiting for someone to answer the phone.

SUMMARY OF THE INVENTION

Accordingly, it is an object of the present invention to provide an improved key telephone system which allows the user to suitably dispose of calls coming in on the main extension when he is talking on the pseudo-extension of the key telephone set.

According to the present invention, the foregoing object, among others, are achieved by providing a key telephone system comprising: (a) a key telephone set to which is assigned a main extension number and a pseudo extension number; (b) a means for sending a busy tone to a calling party using the main extension number when the key telephone set is busy using the pseudo extension number.

According to another aspect of the present invention, the above-stated objects are achieved by providing a key telephone system comprising: (a) a key telephone set to which is assigned a main extension number and a pseudo extension number; (b) a means for sending a voice message to a calling party on the main extension number when the key telephone set is busy on pseudo extension number, if data for sending a voice message is set in memory established in the key telephone system; (c) a means for setting data for sending voice message in the memory.

According to yet another aspect of the present invention, the above-stated objects are achieved by providing a key telephone system comprising: (a) a key telephone set to which is assigned a main extension number and a pseudo extension number; (b) a recorder for recording a message of a calling party on the main extension number when the key telephone set is busy on the pseudo extension number, if data for recording the message of the calling party is set in memory established in the key telephone system; (c) a means for setting data for recording the message of the caller party in the memory.

According to yet another aspect of the present invention, the above-stated objects are achieved by providing a key telephone system comprising: (a) a key telephone set to which is assigned a main extension number and a pseudo extension number; (b) an indicator for indicating whether data for sending a busy tone should be sent to a calling party on the main extension number when the key telephone set is busy on the pseudo extension number is set.

According to yet another aspect of the present invention, the above-stated objects are achieved by providing a key telephone system comprising: (a) a key telephone set to which is assigned a main extension number and a pseudo extension number; (b) a means for sending a busy tone to a calling party on the main extension number when the key telephone set is busy on the pseudo extension number; (c) an indicator for indicating that a telephone call is received.

According to yet another aspect of the present invention, the above-stated objects are achieved by providing a key telephone system comprising: (a) a key telephone set to which is assigned a main extension number and a pseudo extension number; (b) a means for sending a busy tone to a calling party on the main extension number when the key telephone set is busy on the pseudo extension number, if data for sending busy tone is set in memory established in the key telephone system; (c) a means for setting data for sending a busy tone for every telephone number of the caller party in the memory.

According to yet another aspect of the present invention, the above-stated objects are achieved by providing a key telephone system comprising: (a) a key telephone set to which is assigned a main extension number and a pseudo extension number; (b) a means for sending a busy tone to a calling party on the main extension number when the key telephone set is busy on the pseudo extension number, if data for sending a busy tone is set in memory established in the key telephone system; (c) a means for setting data for sending busy tone for every telephone number of the calling party in the memory, and for setting a priority of the telephone number in the memory.

According to yet another aspect of the present invention, the above-stated objects are achieved by providing a process for receiving a telephone call to a main extension number and a pseudo extension number in a key telephone system, comprising: (a) a first step for judging whether the main extension number which is the destination of the telephone call is idle, and if the extension number is busy, a busy tone is sent to the calling party; (b) a second step for judging whether data is set for sending a busy tone when the key telephone set of the main extension number is busy, and if the data is set, a busy tone is sent to the calling party without ringing.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete application of the present invention and many of its attendant advantages will be readily obtained by reference to the following detailed description considered in connection with the accompanying drawings, in which:

FIG. 12 is a memory map used in a key telephone system;

FIG. 13 is a memory map used in a key telephone system;

DETAILED DESCRIPTION OF THE PREFERRED EMBODIMENTS

The preferred embodiments of the present invention are described as follows with reference to the above-mentioned figures.

Figure 1:
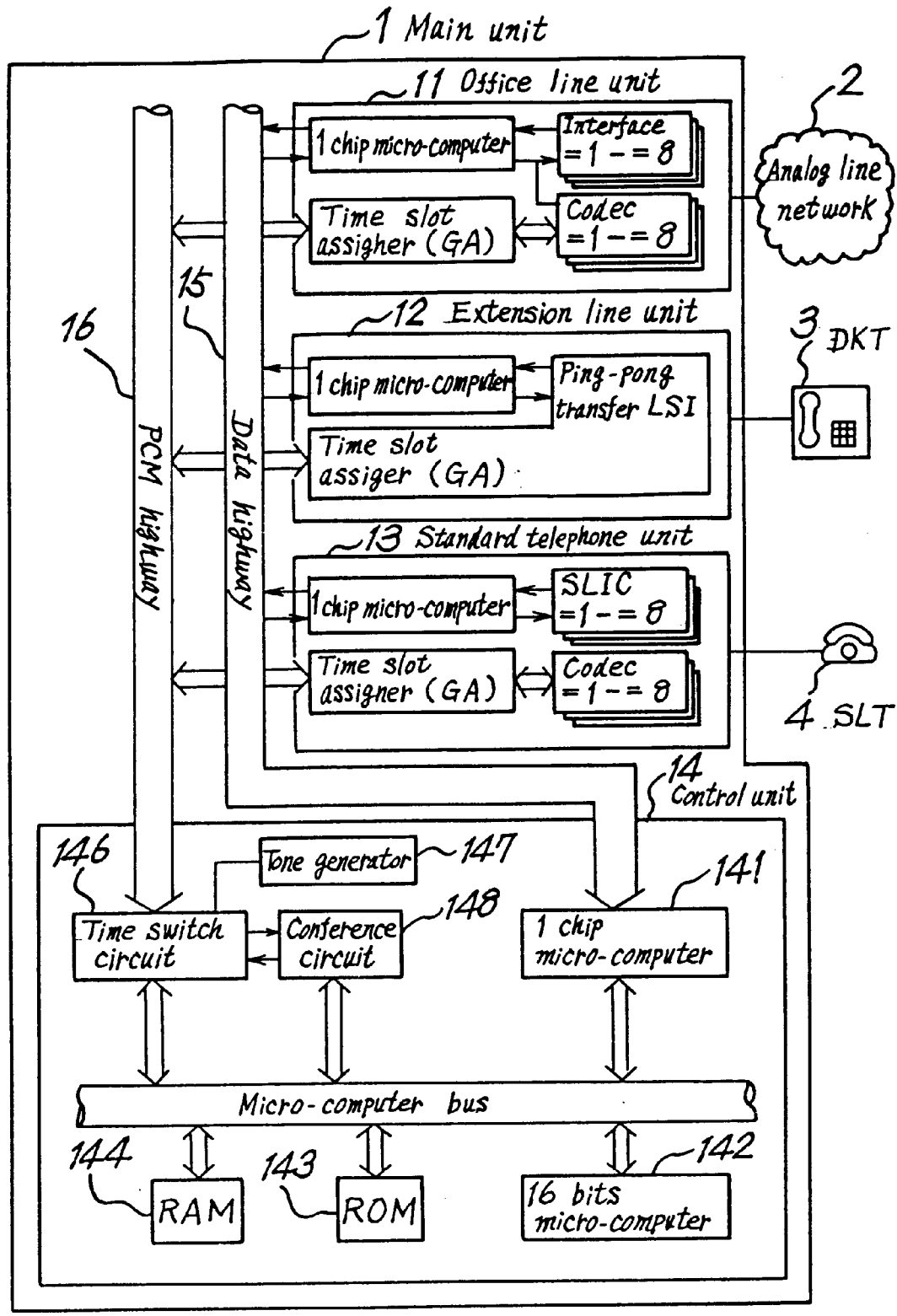
FIG. 1 is a block diagram of a key telephone system of the present invention.

A block diagram of a key telephone system of the first embodiment of the present invention is shown in FIG. 1. A main unit 1 controls telephone calls to an analog line network 2, a digital key telephone set (DKT) 3, and a standard line telephone set (SLT) 4, herein the DKT 3 and SLT 4 are connected to the main unit 1. The main unit 1 has an office line unit 11 connected to the analog line network 2; an extension line unit 12 connected to the DKT 3 and controls the DKT 3; a standard telephone unit 13 connected to the SLT 4 and controls the SLT 4; a control unit 14 for controlling the whole of the main unit 1; a data highway 15 for sending control data between every above-mentioned unit; and a PCM highway 16 for sending voice data between every above-mentioned unit. The control unit 14 has an one chip micro-computer 141 for analyzing control data sent from the data highway 15; a 16-bit micro-computer 142 for controlling a telephone call based on analysis of the one chip micro-computer 141 and for performing process concerned with the telephone call; a ROM 143 for memorizing the program of the 16-bit micro-computer 142; a RAM 144 for memorizing various data required for the processing operation; a time switch circuit 146 for exchanging office unit 11, an extension line unit 12 and a standard telephone unit 13 with control unit 14 by using PCM highway 16; a tone generator 147 for generating various tone signals; and a conference circuit 148 for holding a conference by a telephone.

Figure 2:
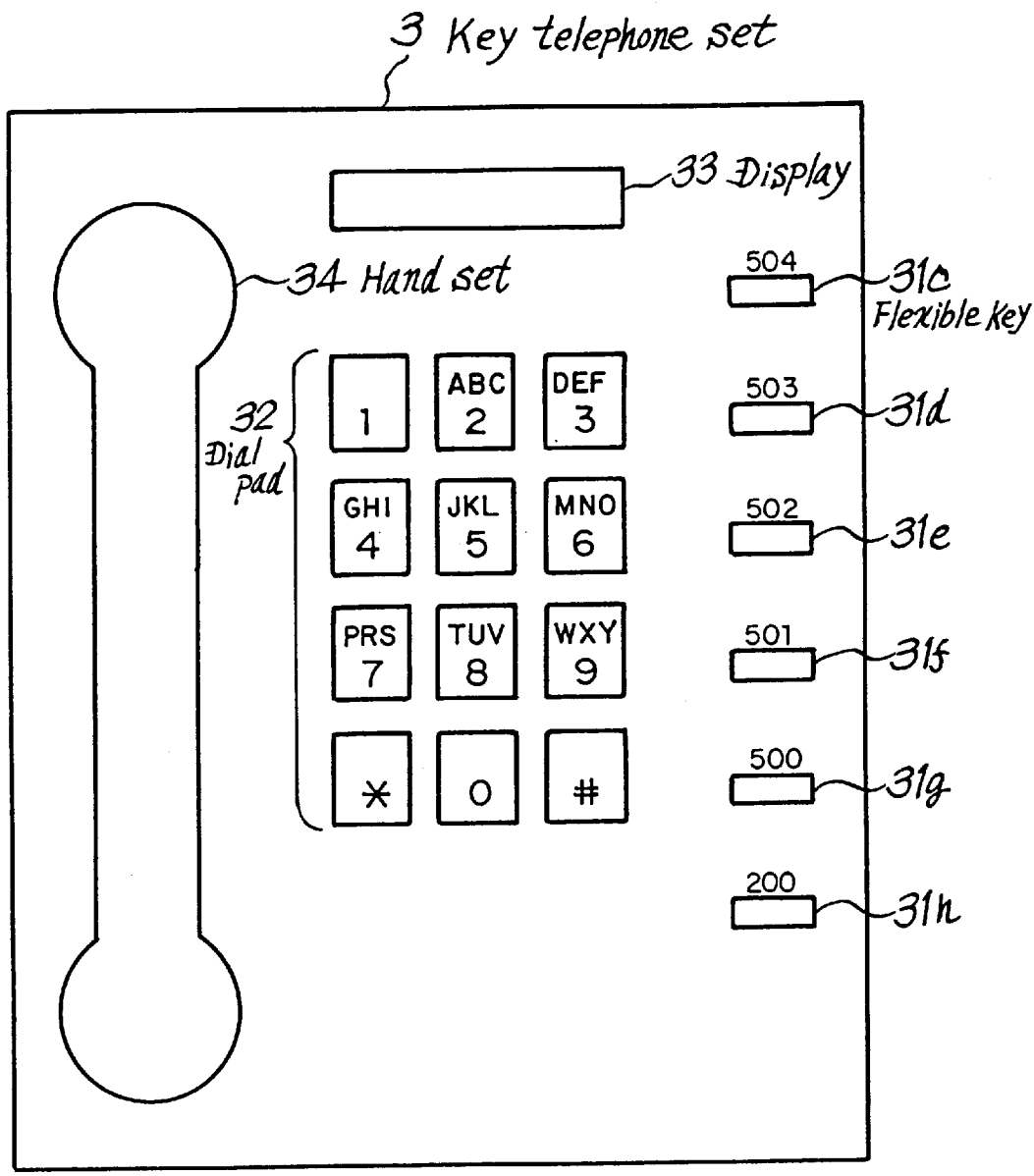
FIG. 2 is a plan view of a key telephone set.

FIG. 2 is a plan view of DKT 3 shown in FIG. 1. DKT 3 has a plurality of flexible keys 31c~31h to which are assigned various extension numbers, a dial pad 32, a display 33 for indicating various information, and a handset 34, wherein the display 33 can be LCD. Here, pseudo extension numbers No. 504~500 are assigned to flexible keys 31c~31g, and extension number No. 200 of DKT 3 is assigned to flexible key 31h.

The action of the key telephone system of the present invention is explained as follows.

First, a receiving mode for receiving a telephone call on the main extension number when DKT 3 is busy on the pseudo extension number is set on main unit 1. Where the receiving mode has two modes, the first mode is the BT mode for sending a busy tone to a third party, and the second mode is the RBT mode for sending a ring-back tone to a third party when the call from the third party is received on the main extension number while the pseudo extension number is in use. Therefore, DKT 3 sends a request for setting the receiving mode to the one-chip micro-computer 141 through the main extension line unit 12 and data highway 15. When the one-chip micro-computer 141 receives the request, the 16-bit micro-computer 142 begins to set the receiving mode to RAM 144, and according to input data from DKT 3, RAM 144 memorizes the receiving mode of DKT 3.

Figure 3:
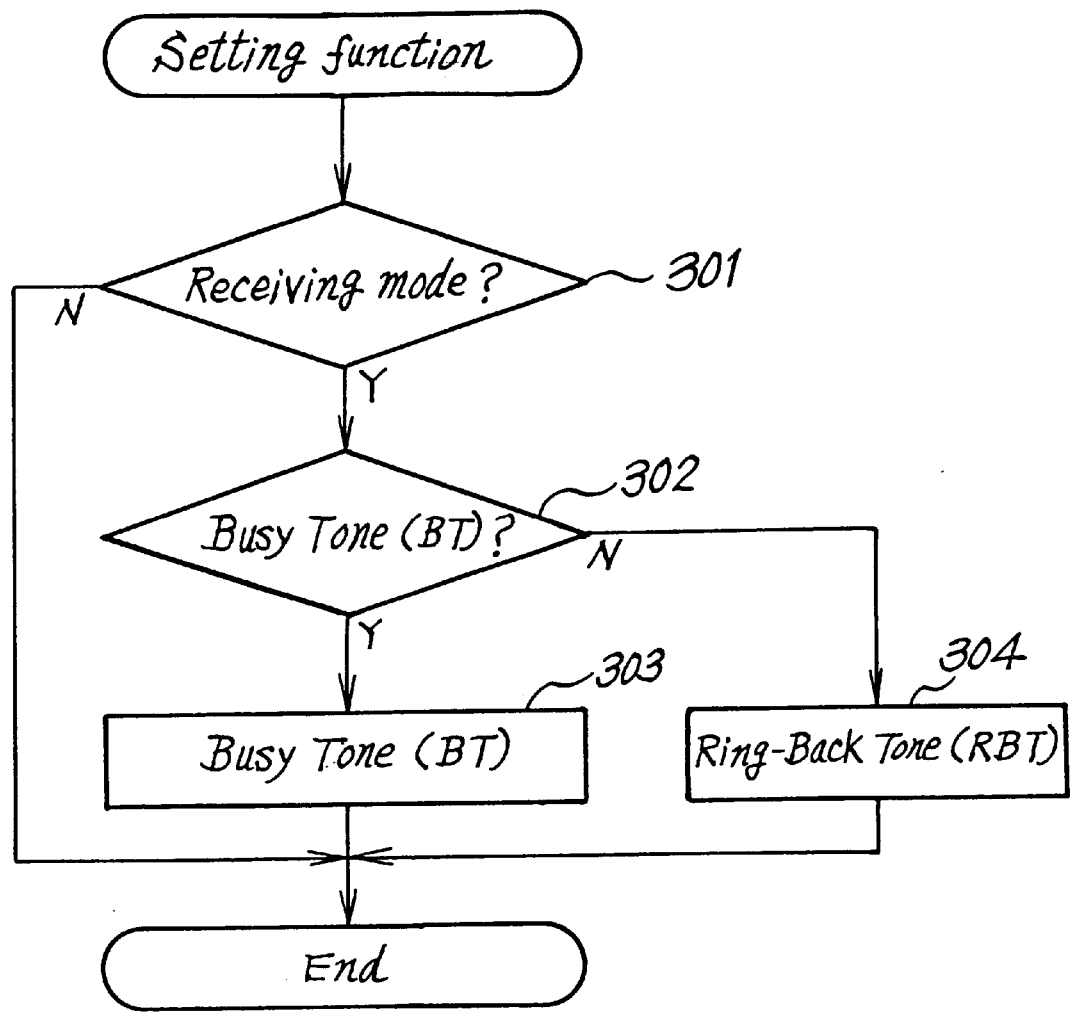
FIG. 3 is a flow chart illustrating the operation for setting a Receiving mode of a key telephone set to a main unit.

FIG. 3 is a flow chart illustrating the operation for setting the receiving mode of the key telephone set. First, the 16-bit micro-computer 142 decides whether the function mode for setting the receiving mode is set or not (STEP 301). If the function mode is not set, the operation ends. On the other hand, if the function mode is set, the 16-bit micro-computer 142 decides whether the receiving mode is BT mode for sending a busy tone to the third party on the extension number, or RBT mode for sending a ring-back tone to the third party (STEP 302). If the receiving mode is BT mode, the 16-bit micro-computer 142 sets the BT mode of DKT 3 on RAM 144 (STEP 303). If the receiving mode is RBT mode, the 16-bit micro-computer 142 sets the RBT mode of DKT 3 on RAM 144 (STEP 304). After the BT mode is set on RAM 144, the main unit 1 sends a busy tone to the third party when the call from the third party is received on the main extension number No. 200, while the pseudo extension number is in use. After the RET mode is set on RAM 144, the main unit 1 sends a ring-back tone to the third party and make DKT 3 ring when the call from the third party is received on the main extension number No. 200 while the pseudo extension number is in use.

Figure 4:
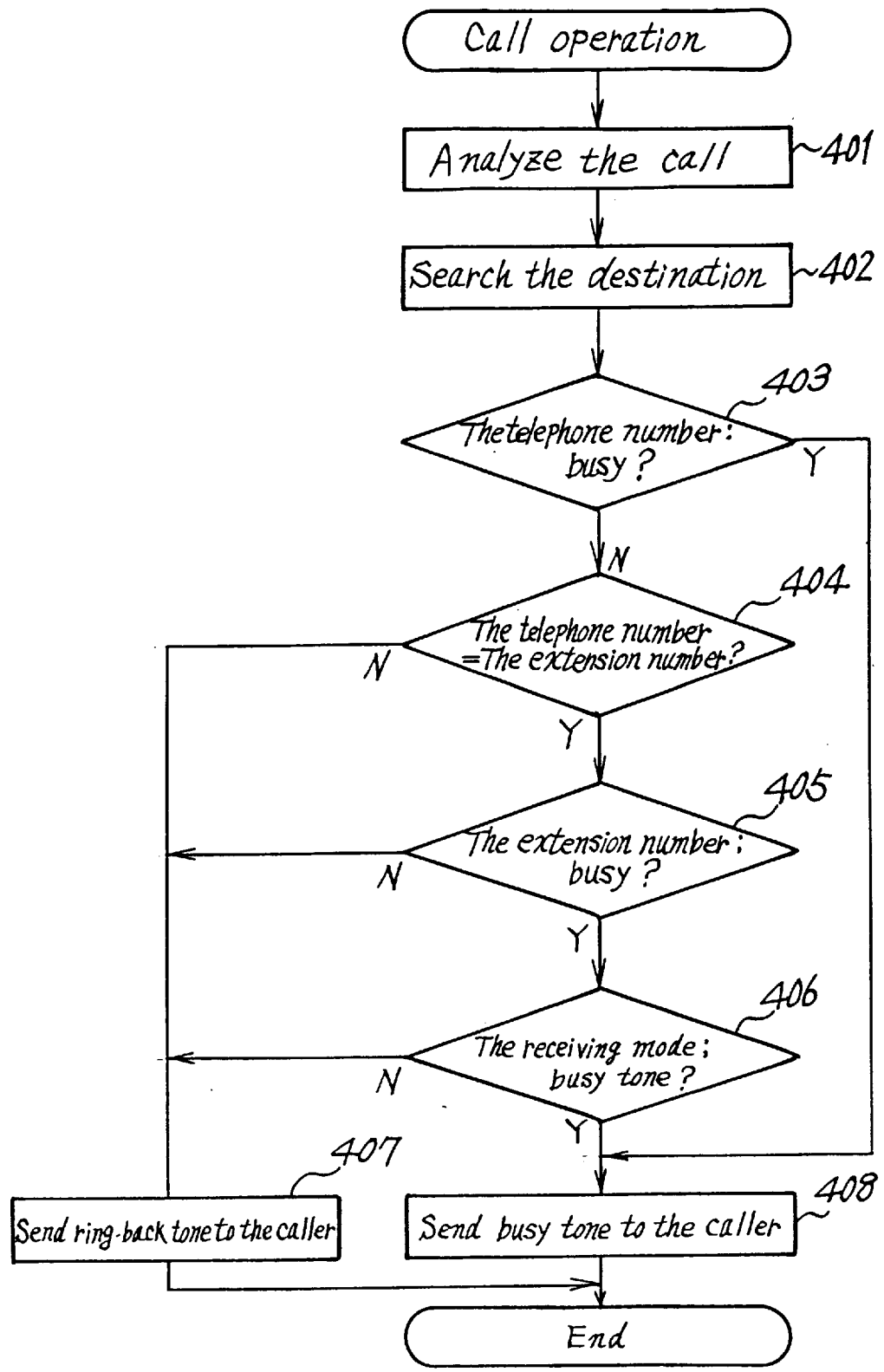
FIG. 4 is a flow chart illustrating the operation for receiving a telephone call of a key telephone system.

FIG. 4 is a flow chart illustrating the operation of control unit 14 for receiving a telephone call. When a telephone call is received from office line unit 11, extension line unit 12, or standard telephone unit 13, the one-chip micro-computer 141 analyzes the telephone call and connects with the 16-bit micro-computer 142 (STEP 401). Next, the 16-bit micro-computer 142 searches for the destination of the telephone call (STEP 402). In Case 1, a destination of the telephone call is DKT 3.

Next, the 16-bit micro-computer 142 decides whether the extension number which is the destination is busy or not (STEP 403). If the extension number which is the destination is busy, the main unit 1 sends a busy tone to the calling party (STEP 408). If the extension number which is the destination is not busy, 16-bit micro-computer 142 decides whether the extension number is the main extension number No. 200 of DKT 3 or not (STEP 404). If the extension number is not the main extension number No. 200 of DKT 3 but the pseudo extension number (for example, No. 501), the main unit 1 sends a ring-back tone to the calling party (STEP 407). If the extension number is the main extension number No. 200, the 16-bit micro-computer 142 decides whether DKT 3, which is the destination, is busy using the pseudo extension number or not (STEP 405). If DKT 3 which is the destination, is busy using the pseudo extension number, the receiving mode on RAM 144 is referred to (STEP 406). If the receiving mode is BT mode, the 16-bit micro-computer 142 sends a busy tone from the tone generator 147 to the calling party through the time switch circuit 146 and the PCM highway 16 (and office line unit 11, for example) (STEP 408). On the other hand, if the receiving mode is in RBT mode, the 16-bit micro-computer 142 sends a ring-back tone from the tone generator 147 to the calling party through the time switch circuit 146 and the PCM highway 16 and makes the DKT 3 ring (STEP 407).

According to the present invention, the main unit 1 can send a busy tone to the calling party on the main extension number when DKT 3 is busy on the pseudo extension number if the BT mode is set as the receiving mode, so that the caller on the main extension number can immediately know that DKT 3, which is the destination, is busy and take the preferred action. Furthermore, DKT 3 is not ringing while DKT 3 is busy, so that the user of DKT 3 can continue the telephone call calmly.

Yet, if RBT mode is set as the receiving mode in the main unit 1, the user of DKT 3 can use the conventional receiving mode, so that DKT 3 is more flexible.

Figure 5:
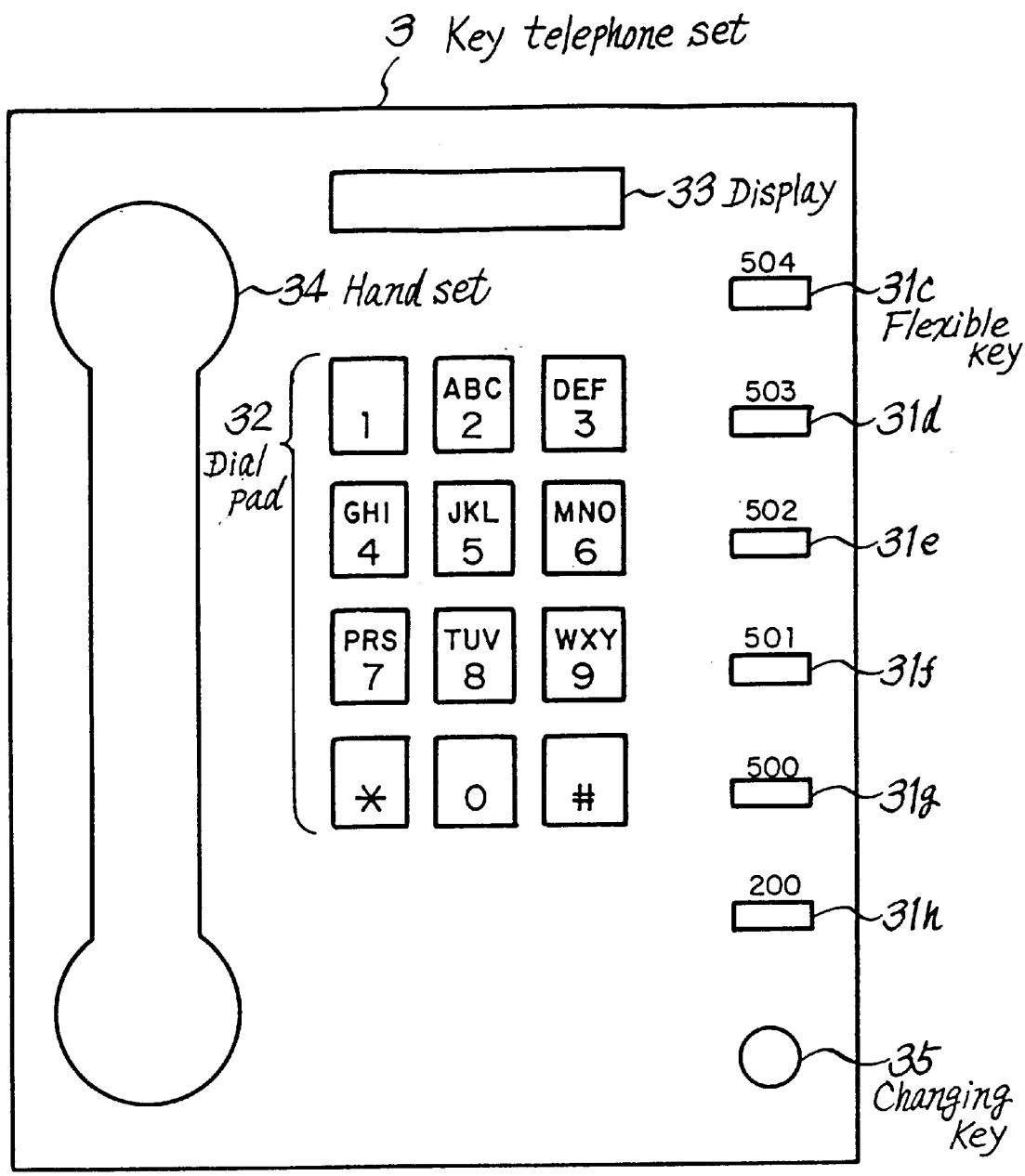
FIG. 5 is a plan view of a key telephone set.

FIG. 5 is a plan view of the key telephone set (DKT) 3 according to the second embodiment of the invention. It differs from embodiment 1 in that DKT 3 shown in FIG. 5 has a changing key 35 for changing the receiving mode, but the other elements of DKT 3 shown in FIG. 5 are the same as embodiment 1. And, the elements of the main unit 1 are the same.

Figure 6:
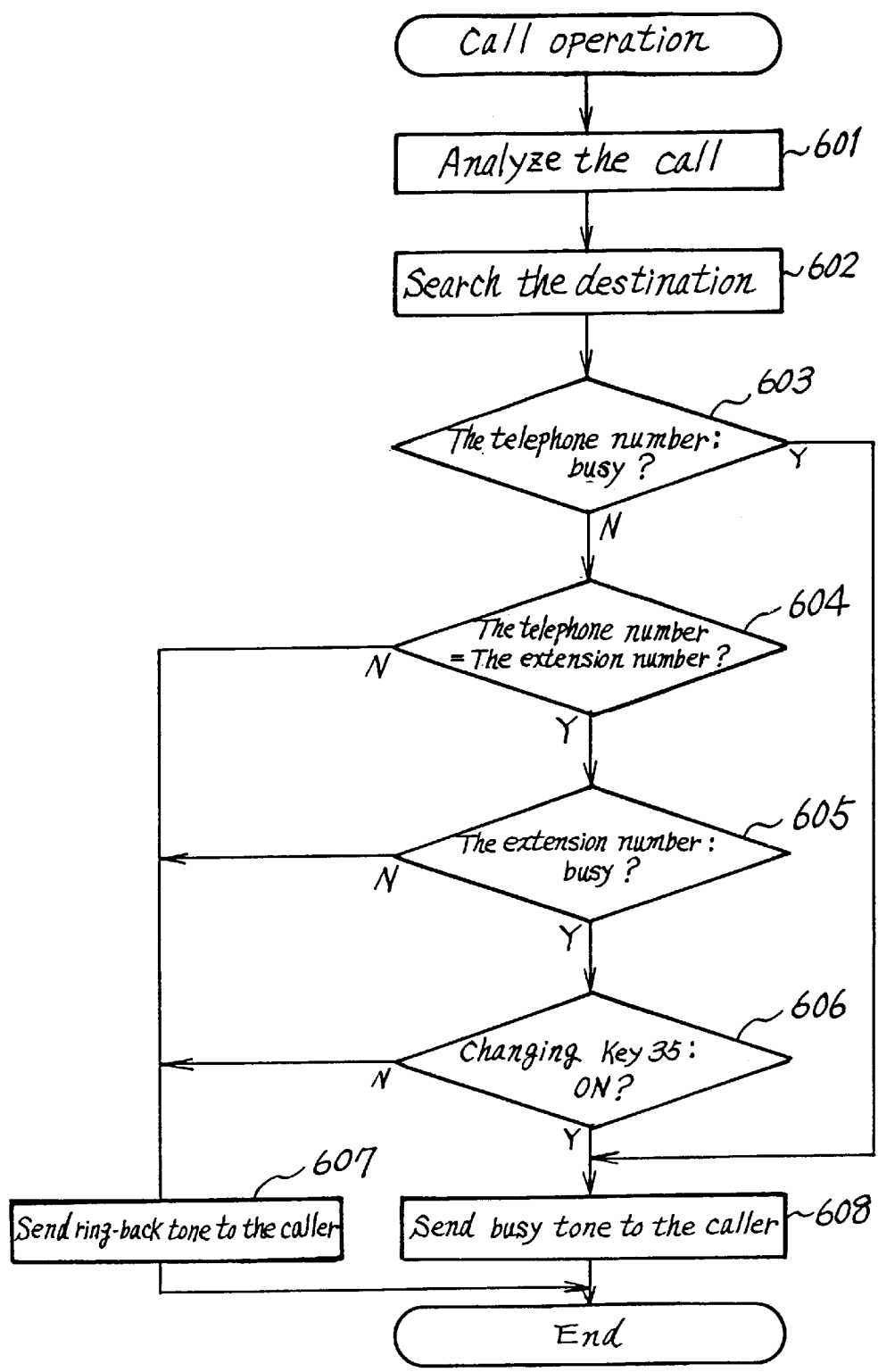
FIG. 6 is a flow chart illustrating the operation for receiving a telephone call of a key telephone system.

The action of the key telephone system of the present embodiment is explained as follows, referring to FIG. 6 which is a flow chart.

When a telephone call is received from office line unit 11, extension line unit 12, or standard telephone unit 13, the one-chip micro-computer 141 analyzes the telephone call and connects with 16-bit micro-computer 142 (STEP 601). Next, the 16-bit micro-computer 142 searches for the destination of the telephone call (STEP 602). In embodiment 2, the destination of the telephone call is DKT 3.

Next, the 16-bit micro-computer 142 decides whether the extension number which is the destination is busy or not (STEP 603). If the extension number which is the destination is busy, the main unit 1 sends a busy tone to the calling party (STEP 608). If the extension number which is the destination is not busy, the 16-bit micro-computer 142 decides whether the extension number is the main extension number No. 200 of DKT 3 or not (STEP 604). If the extension number is not the main extension number No. 200 of DKT 3 but the pseudo extension number (for example, No. 501), the main unit 1 sends a ring-back tone to the caller side (STEP 607). If the extension number is the main extension number No. 200, the 16-bit micro-computer 142 decides whether the DKT 3 which is the destination is busy using the pseudo extension number or not (STEP 605). If the DKT 3 which is the destination is busy using the pseudo extension number, the 16-bit micro-computer 142 decides whether the changing key 35 is on or off (STEP 606). If the changing key 35 is on, the 16-bit micro-computer 142 sends a busy tone from the tone generator 147 to the calling party through the time switch circuit 146 and PCM highway 16 (and office line unit 11, for example) (STEP 608). On the other hand, if the changing key 35 is off, the 16-bit micro-computer 142 sends a ring-back tone from the tone generator 147 to the DKT 3 through the time switch circuit 146 and PCM highway 16 (STEP 607).

According to the present embodiment, the main unit 1 can send a busy tone to the calling party on the main extension number when DKT 3 is busy on the pseudo extension number if the changing key 35 is on. Then, the caller on the main extension number can immediately know that DKT 3, which is the destination, is busy and take the preferred action. In addition, the operation of the changing key 35 is performed beforehand, so that after the main extension number of DKT 3 is received, when a second telephone call in communicating with a first telephone call on the pseudo extension number comes in, the receiving mode does not change although the user of DKT 3 pushes the changing key 35.

Figure 7:
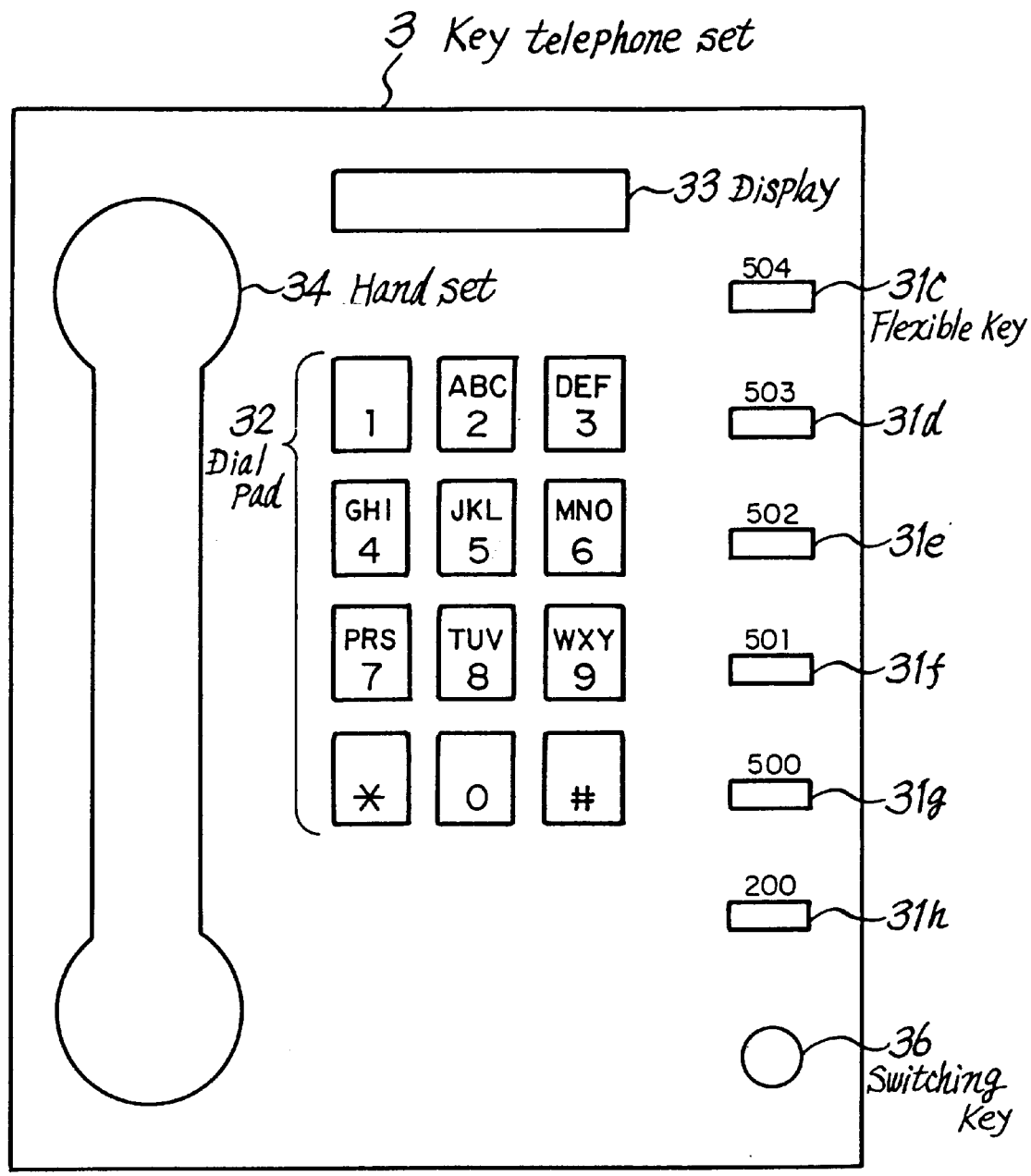
FIG. 7 is a plan view of a key telephone set.

FIG. 7 is a plan view of the key telephone set (DKT) 3 according to the third embodiment of the invention. It differs from embodiment 1 in that the DKT 3 shown in FIG. 7 has a switching key 36 for switching the receiving mode, but other elements of DKT 3 shown in FIG. 7 are the same as embodiment 1. And, the elements of main unit 1 are the same.

The action of the key telephone system of the present embodiment is explained as follows, referring to FIG. 8 which is a flow chart.

When a telephone call is received from office line unit 11, extension line unit 12, or standard telephone unit 13, the one-chip micro-computer 141 analyzes the telephone call and connects with the 16-bit micro-computer 142 (STEP 801). Next, the 16-bit micro-computer 142 searches for the destination of the telephone call (STEP 802). In embodiment 3, the destination of the telephone call is DKT 3.

Next, the 16-bit micro-computer 142 decides whether the extension number which is the destination is busy or not (STEP 803). If the extension number which is the destination is busy, main unit 1 sends a busy tone to the calling party (STEP 807). If the extension number which is the destination is not busy, the 16-bit micro-computer 142 sends a ring-back tone to the calling party (STEP 804).

At STEP 804, if the state of the telephone call changes when the 16-bit micro-computer 142 sends a ring-back tone to the calling party, for example, if the caller hangs up the telephone call or the handset 34 of the DKT 3 is off the hook, the operation is ended (STEP 805). If the state of the telephone call does not change, the 16-bit micro-computer 142 decides whether the switching key 36 is pushed or not (STEP 806). If the switching key 36 is not pushed, the operation goes to STEP 804. If the switching key 36 is pushed, the operation goes to STEP 807. That is, the 16-bit micro-computer 142 stops sending a ring-back tone, and begins sending busy-tone.

At STEP 807, the 16-bit micro-computer 142 decides whether or not the caller has hung up the telephone (STEP 808). If the caller hangs up the telephone, the operation is ended; and if the caller does not hang up the telephone, the operation goes to STEP 807.

According to the present invention, main unit 1 can stop sending a ring-back tone and begin sending a busy tone to the calling party by the main extension number when DKT 3 is busy on the pseudo extension number if switching key 36 is pushed, so that the first telephone call of the user of DKT 3 is not disturbed by the ringing of the second telephone call, producing is the same effect as in embodiment 1.

In addition, the receiving mode, which is RBT mode or BT mode, may be displayed on display 33 according to whether the switching key 36 is pushed when a second telephone call is received when the pseudo extension number is in use. For example, the receiving mode is displayed by a letter. Thereto, the selected mode may be made known by blinking the lights of the LED etc. of the luminescent element included in the change key 36.

Moreover, after the receiving mode is switched to the BT mode by pushing the switching key 36 during a telephone call using the pseudo extension number, the active receiving mode may be memorized on the RAM 144 and the receiving mode of subsequent telephone calls may become a BT mode automatically.

Moreover, even if the switching key 36 is pushed during a first telephone call on the pseudo extension number when a second telephone call is received, the 16-bit micro-computer 142 detects it and may reserve the receiving mode of the switching key 36 on the RAM 144 and may keep the present receiving mode. The next time, if a second telephone call is received when the pseudo extension number is in use, the 16-bit micro-computer 142 may check the receiving mode on the RAM 144 and may send a busy tone to the calling party of the second telephone call instead of a ring-back tone. In this case, if the switching key 36 is pushed during a first telephone call using the pseudo extension number except when a second telephone call is received, the 16-bit micro-computer 142 detects it and may erase the present receiving mode and set the new receiving mode on RAM 144. After that, if a second telephone call is received when the pseudo extension number is in use, the 16-bit micro-computer may send a ring-back tone to the calling party of the second telephone call.

Figure 9:
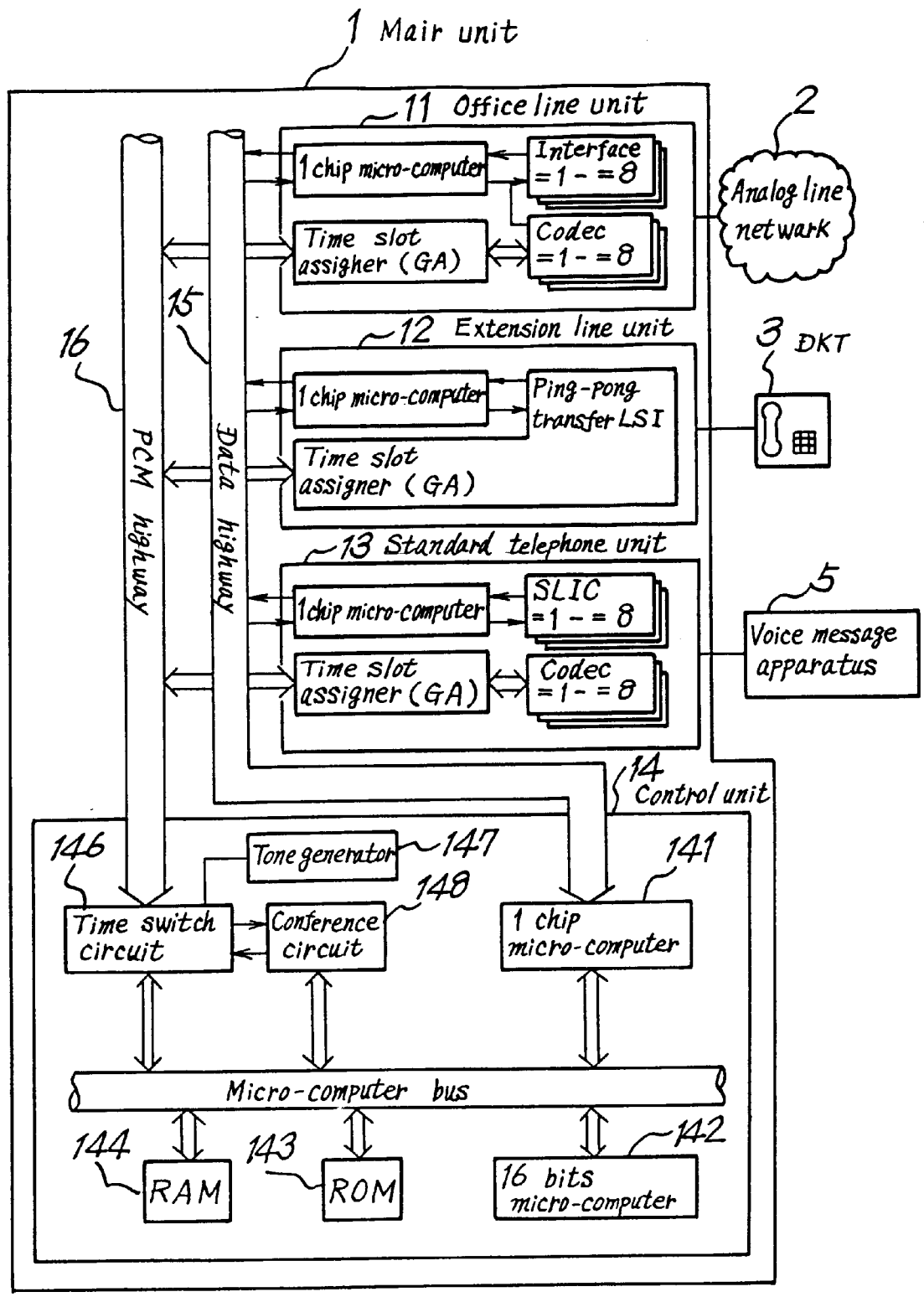
FIG. 9 is a block diagram of a key telephone system of the present invention.

FIG. 9 is a block diagram of a key telephone system according to a fourth embodiment of the present invention. In embodiment 4, a voice message apparatus 5 is connected to standard telephone unit 13, instead of a SLT 4. And the DKT 3 has a switching key 36 for switching the receiving mode, the same as the DKT 3 shown in FIG. 7.

The action of the key telephone system of the present embodiment is explained as follows, referring to FIG. 10 which is a flow chart.

Figure 8:
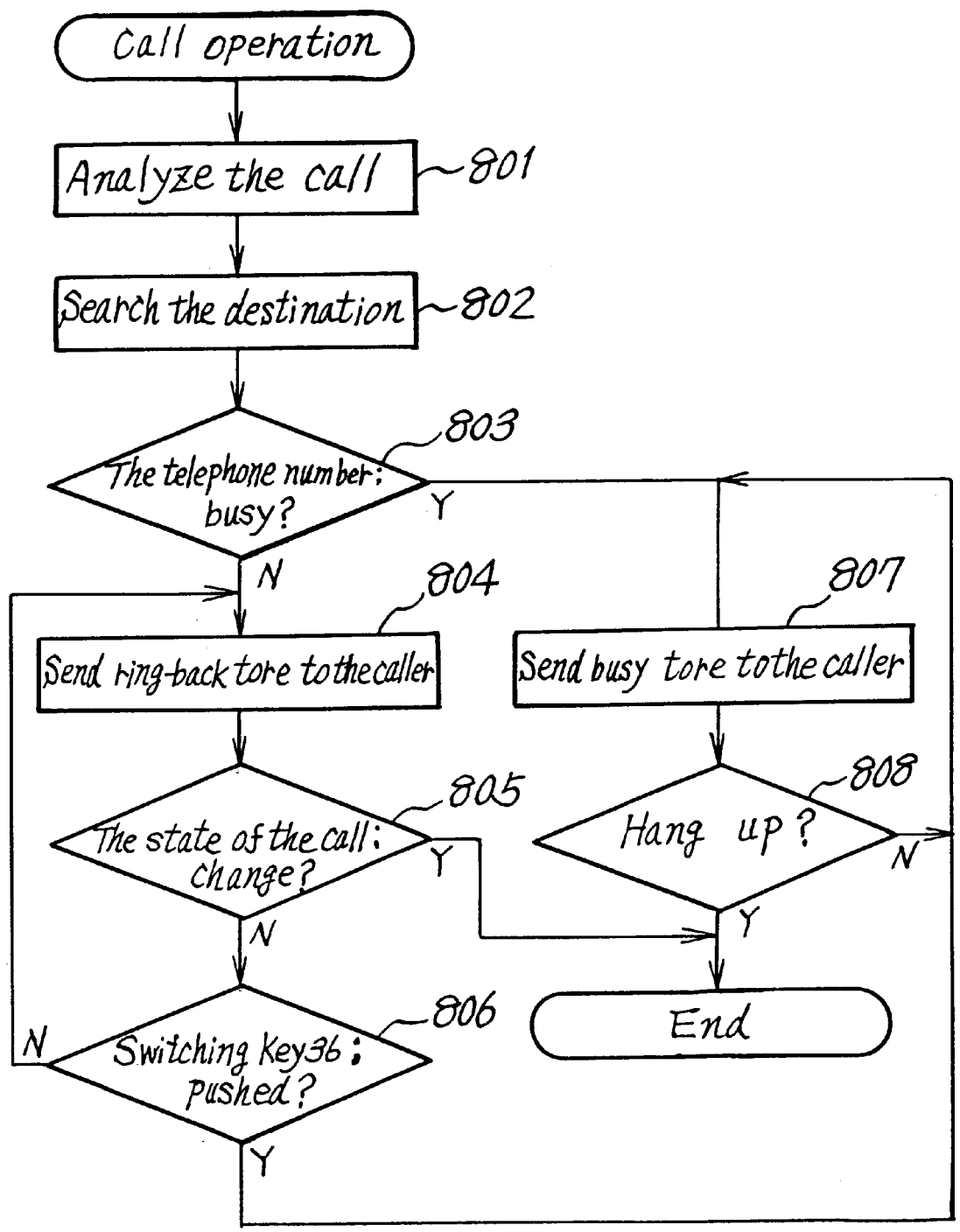
FIG. 8 is a flow chart illustrating the operation for receiving a telephone call of a key telephone system.
Figure 10:
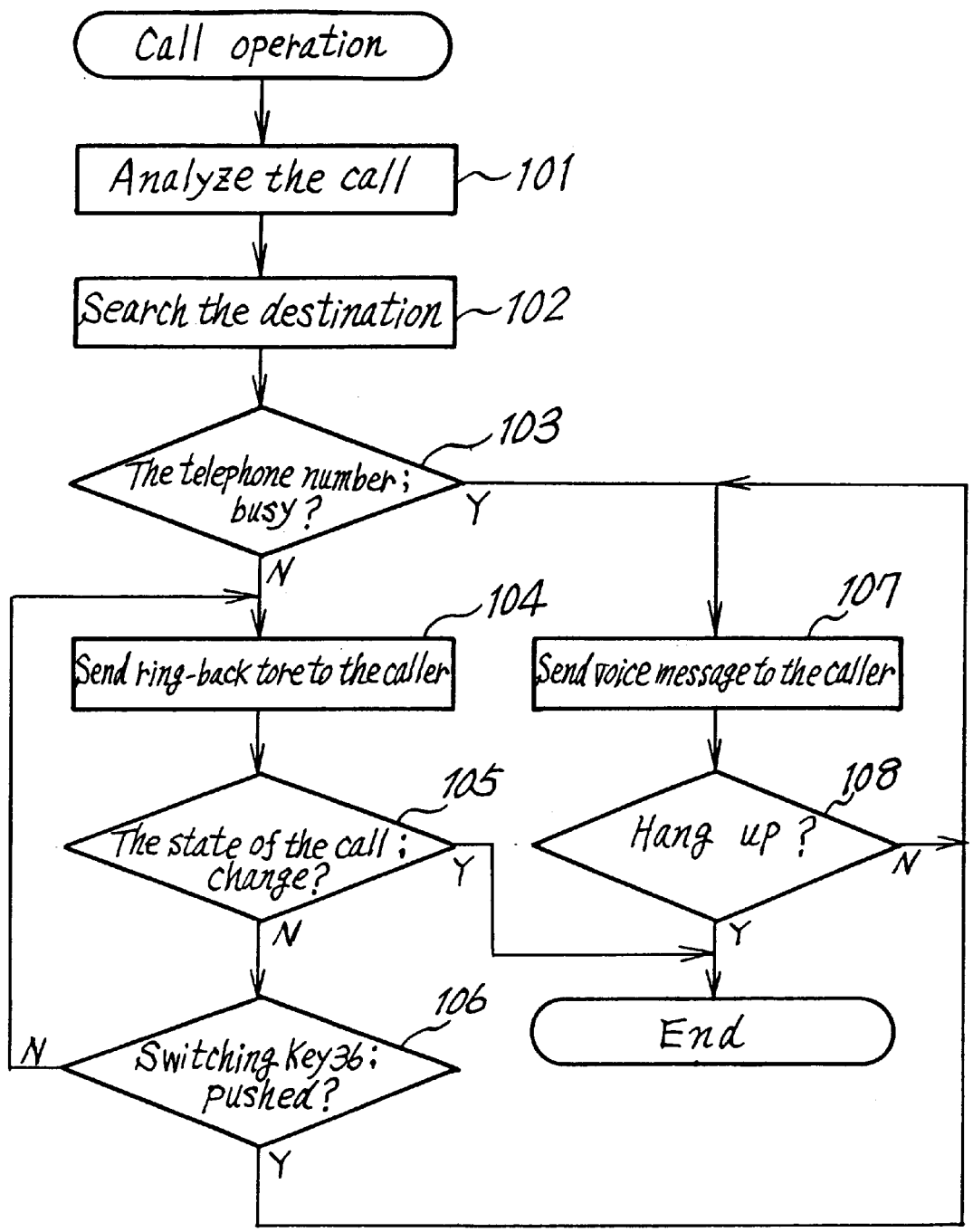
FIG. 10 is a flow chart illustrating the operation for receiving a telephone call of a key telephone system.

The operation of STEPS 101~106 and STEPS 108 shown in FIG. 10 are the same as the operation of STEPS 801~806 and STEPS 808 shown in FIG. 8. But the operation of STEP 107 shown in FIG. 10 differs from the operation of STEP 807 shown in FIG. 8. When a second telephone call is received from a second calling party when the pseudo extension number is in use, the 16-bit micro-computer 142 in control unit 14 shown in FIG. 9 connects the standard telephone unit 13 with the second calling party through PCM highway 16 by using the time switch circuit 146, and sends starting data through data highway 15 for starting the voice message apparatus 5 (STEP 107). A voice message is then sent from the voice message apparatus 5 to the second calling party. For example, the voice message can say "This telephone is busy. Please hang up and call back later".

According to the present embodiment, the main unit 1 can stop sending a ring-back tone and begin sending a busy tone to the calling party using the main extension number when the DKT 3 is busy using the pseudo extension number if the switching key 36 is pushed, so that the condition of DKT 3 is told to the second calling party, and the user of DKT 3 is not disturbed by the ringing of the second telephone call, thus producing the same effect as in embodiment 1.

In addition, the above-mentioned variant which stops ringing the DKT 3 and sends the voice message to the calling party saying that DKT 3 is busy is similarly applied to embodiment 1 and embodiment 2, producing is the same effect.

Furthermore, it not only sends voice message, but may be further programmed constitute so that a caller's message can be recorded. Several methods are contemplated for recording voice either digitally or in analog. For example, magnetic media, such as disks or tapes, optical media, or solid state memories may record voice data.

The fifth embodiment includes the same elements as the key telephone system shown in FIG. 1 and FIG. 2, but the fifth embodiment uses a different method of setting the receiving mode. The receiving mode of DKT 3 is switched by inputting a special number, though it is switched by pushing switching key 36 in embodiment 3.

Figure 11:
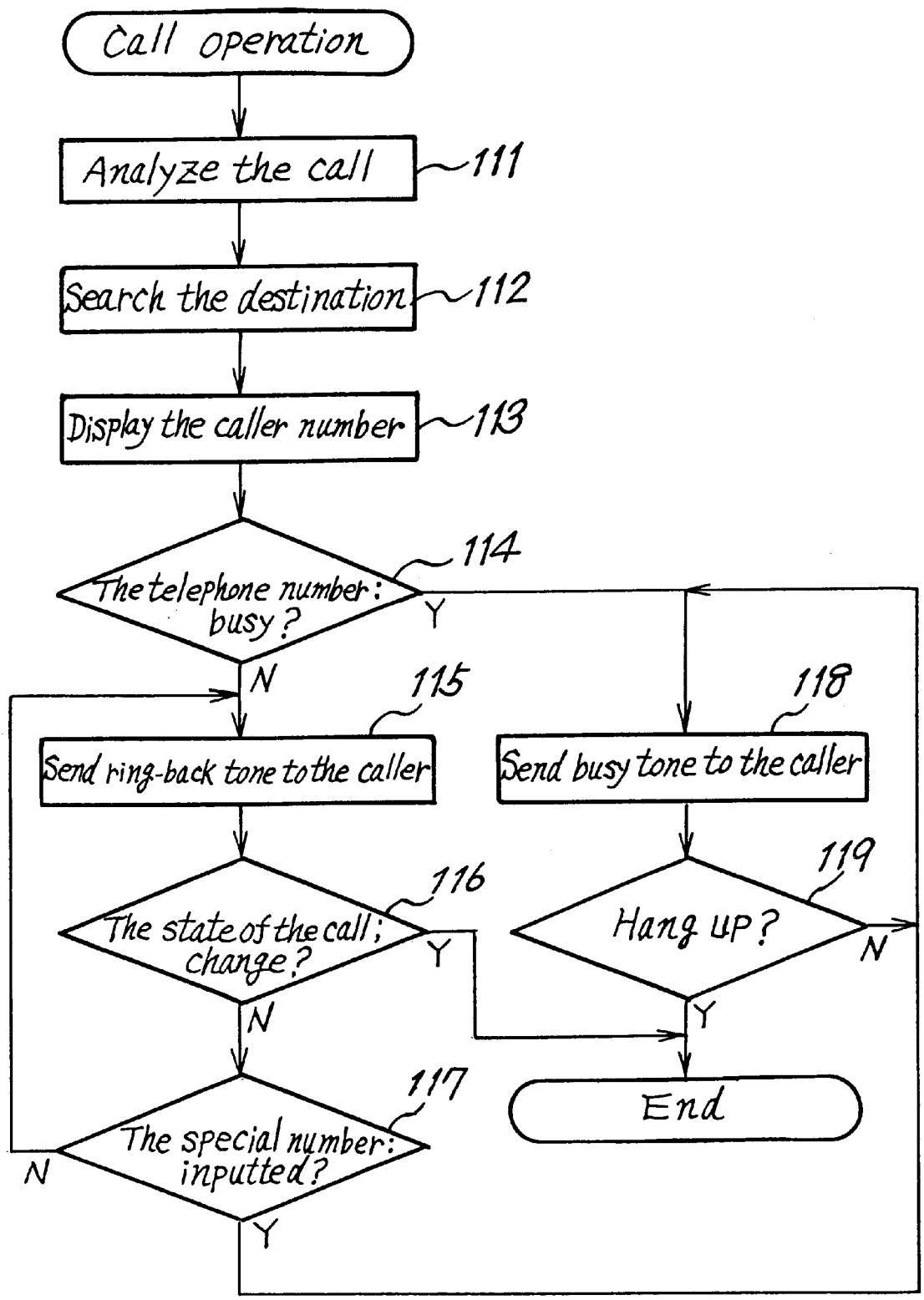
FIG. 11 is a flow chart illustrating the operation for receiving a telephone call of a key telephone system.

The action of the key telephone system of the fifth embodiment is explained as follows, referring to FIG. 11 which is a flow chart.

When a telephone call is received from the office line unit 11, on extension line unit 12 or the standard telephone unit 13, the one-chip micro-computer 141 analyzes the telephone call and connects with the 16-bit micro-computer 142 (STEP, 111). Next, the 16-bit micro-computer 142 searches for the destination of the telephone call (STEP 112). In embodiment 5, the destination of the telephone call is DKT 3, and the telephone number of the calling party is displayed on the display 33 (STEP 113).

Next, the 16-bit micro-computer 142 decides whether the extension number which is the destination is busy or not (STEP 114). If the extension number which is the destination is busy, the main unit 1 sends a busy tone to the calling party (STEP 118). If the extension number which is the destination is not busy, the 16-bit micro-computer 142 sends a ring-back tone to the caller party (STEP 115).

At STEP 115, if the state of the telephone call changes when the 16-bit micro-computer 142 sends the ring-back tone to the calling party, i.e., if the caller hangs up the telephone call or the handset 34 of DKT 3 is off-hook, the operation ends (STEP 116). If the state of the telephone call does not change, the 16-bit micro-computer 142 decides whether the special number has been programmed or not (STEP 117). If the special number has not been programmed, the operation goes to STEP 115. And if the special number has been programmed, the operation goes to STEP 118. That is, the 16-bit micro-computer 142 stops sending the ring-back tone, and begins sending the busy-tone.

At STEP 118, the 16-bit micro-computer 142 decides whether the caller has hung up the telephone call or not (STEP 119). If the caller hangs up the telephone call, the operation ends; if the caller does not hang up the telephone call, the operation goes to STEP 118.

According to the present embodiment, the main unit 1 can stop sending a ring-back tone and begin sending a busy tone to the calling party on the main extension number when DKT 3 is busy on the pseudo extension number if the special number is inputted, so that the user of DKT 3 is not disturbed by the ringing of the second telephone call, thus producing the same effect as in embodiment 1.

In addition, the receiving mode, which is the RBT mode or BT mode, maybe displayed on the display 33 according to the special number when a second telephone call is received when the pseudo extension number is in use.

Moreover, after the receiving mode is switched to a BT mode by inputting the special number during a telephone call on the pseudo extension number, the present receiving mode may be memorized on RAM 144 and the receiving mode of any subsequent telephone call from the same caller may become BT mode automatically.

Moreover, even if the special number is programmed during a first telephone call using the pseudo extension number when a second telephone call is received, the 16-bit micro-computer 142 detects it and may reserve the receiving mode on RAM 144 and may keep the present receiving mode. Subsequently, if a second telephone call is received when the pseudo extension number is in use, the 16-bit micro-computer 142 may check the receiving mode on RAM 144 and may return a busy tone to the second calling party instead of a ring-back tone. In this case, if the special number is programmed when the pseudo extension number is in use and no second telephone call is received, the 16-bit micro-computer 142 detects it and may erase the present receiving mode and set the new receiving mode on RAM 144. After that, if a second telephone call is received when the pseudo extension number is in use, the 16-bit micro-computer 142 may send a ring-back tone to a calling party of the second telephone call.

The sixth embodiment includes the same element as the key telephone system shown in FIG. 1 and FIG. 2, but the sixth embodiment uses a different method of setting the receiving mode. In the above-mentioned embodiment, the receiving mode of DKT 3 is set as BT mode or RBT mode, irrespective of who is the caller.

FIG. 12 illustrates a memory map stored on RAM 144. The receiving mode is set according to the telephone number of a calling party beforehand. For example, the RBT mode is set for caller A, the BT mode is set for caller B and caller C, as shown in FIG. 12. When DKT 3 receives a telephone call of a second calling party, when it is already in use, this memory map is referred to and the DKT 3 is made to ring if the second calling party is caller A, but the DKT 3 is not made to ring and busy tone is sent to the second calling party if the second calling party is caller B or C.

According to the present embodiment, only the telephone call from a party to whom the user has assigned priority, such as an important customer can be received, and unnecessary calls can be eliminated.

In addition, although in this embodiment, the caller's number in either the RBT or BT modes may be registered into the memory map of RAM 144, this embodiment can also function according to the memory map.

The seventh embodiment is a variant of the sixth embodiment. A priority is assigned to every telephone number of a calling party for which the RBT mode is set, so that the receiving mode can be set according to the telephone number.

FIG. 13 illustrates a memory map memorized in RAM 144. For example, caller A is set on RBT mode and given the first priority, caller side B is set on RBT mode and given the second priority, caller C is set on RBT mode and given the third priority. If a telephone call to DKT 3 is received, this memory map shown in FIG. 13 is referred to. DKT 3 will ring only if DKT 3 is receiving the telephone call from caller A or B or C, DKT 3 is rung; but if DKT 3 receives a telephone call from another caller, DKT 3 will not ring and a busy tone will be sent to the calling party. Here, when the second telephone call from caller C is received on the main extension number when the pseudo extension number is in use, the priority of caller C is compared with the priority of caller B. In this case, the priority of caller B is higher than the priority of caller C, and a busy tone is sent to caller C.

Moreover, when the second telephone call from caller A is received on the main extension number when the pseudo extension number is in use, the priority of caller A is compared with the priority of caller B. In this case, the priority of caller A is higher than the priority of caller B, and DKT 3 will ring.

According to the present embodiment, the user of DKT 3 can select the caller and suitably dispose of the call according to the priority of the caller.

Figure 14:
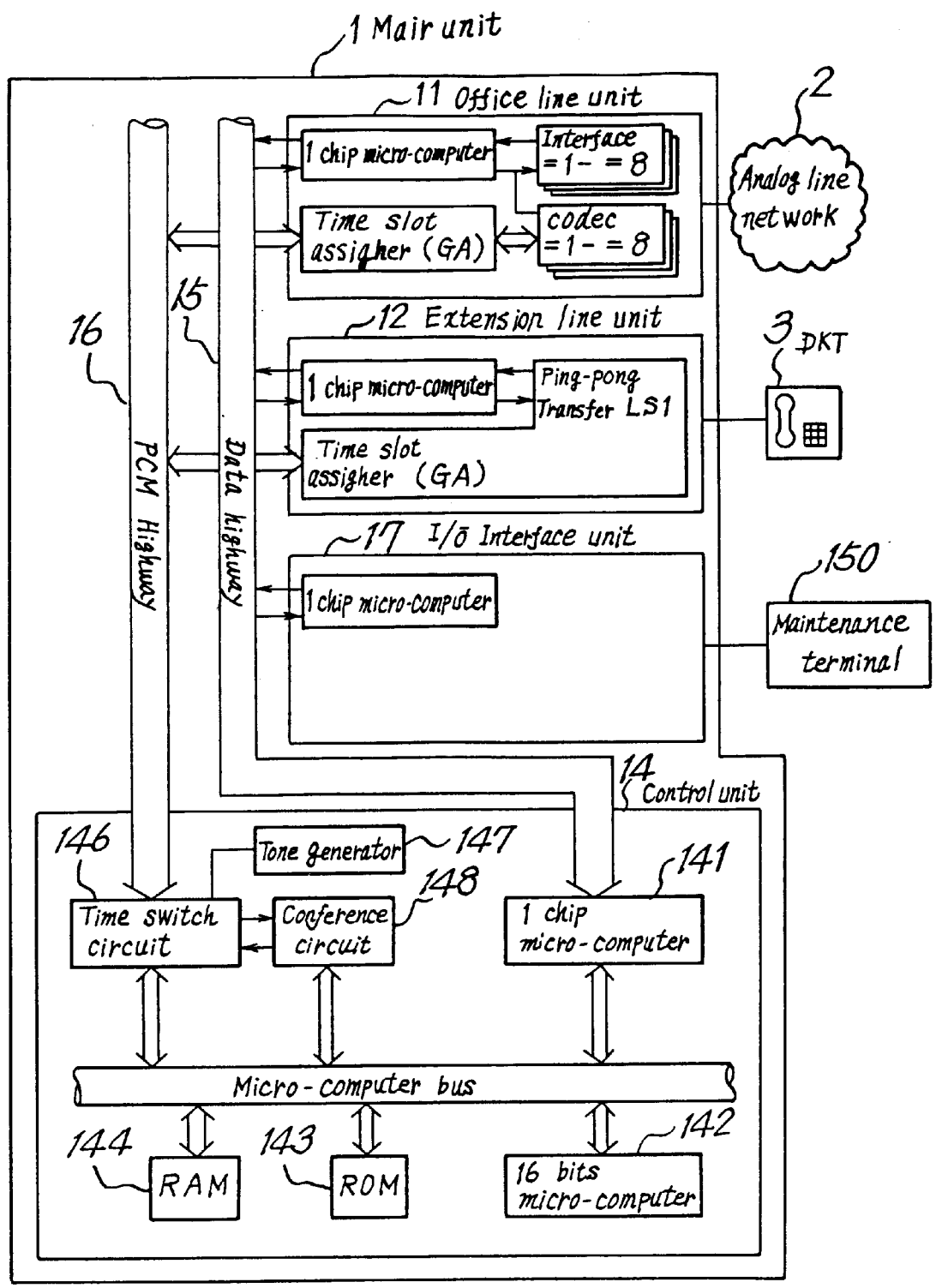
FIG. 14 is a block diagram of a key telephone system of the present invention.

FIG. 14 is a block diagram of a key telephone system according to an eighth embodiment of the present invention. Except that maintenance terminal 150 is connected to I/O interface unit 17, it is the same as the key telephone system shown in FIG. 1. That is, the receiving mode is set by the input means of the maintenance terminal 150, which is connected to the main unit 1 in this embodiment, although the receiving mode is set by the DKT 3 in the above-mentioned embodiments. Since the other operations are the same as that of the above-mentioned embodiments, we omit explanation.

According to the present embodiment, set-up of the receiving mode for every DKT 3 can be performed at the same time.

Figure 15:
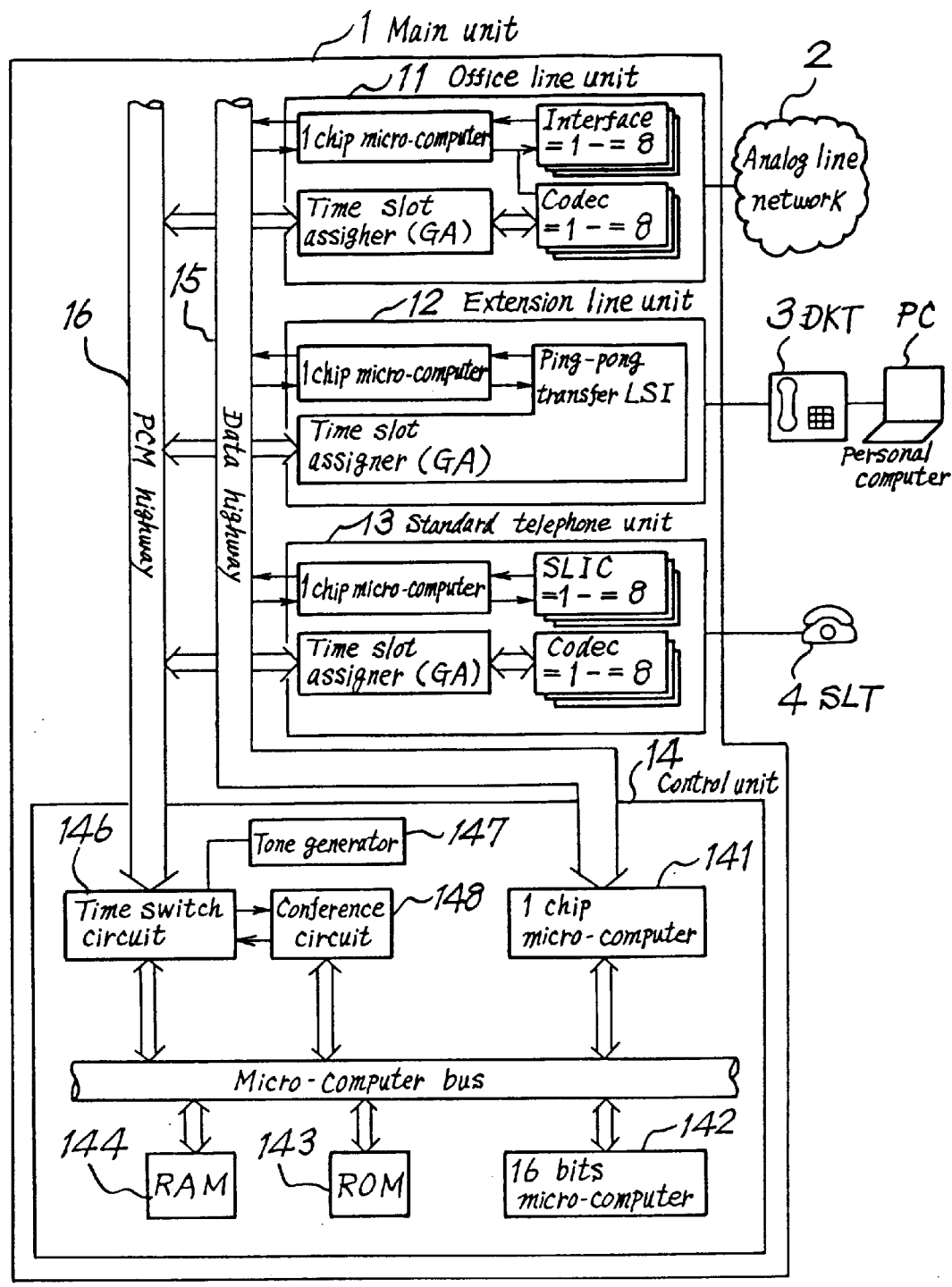
FIG. 15 is a block diagram of a key telephone system of the present invention.

FIG. 15 is a block diagram of a key telephone system according to a ninth embodiment of the present invention. A side from the fact that a personal computer PC is connected to DKT 3, it is the same as the key telephone system shown in FIG. 1. A personal computer PC can send and receive data to and from the control unit 14 despite telephone calls received by the DKT 3. That is, the receiving mode is set by the personal computer PC which is connected to DKT 3 in this embodiment, although the receiving mode is set by DKT 3 in the above-mentioned embodiments 1~7. Since other operations are the same as that of the above-mentioned embodiments, we omit explanation.

Figure 16:
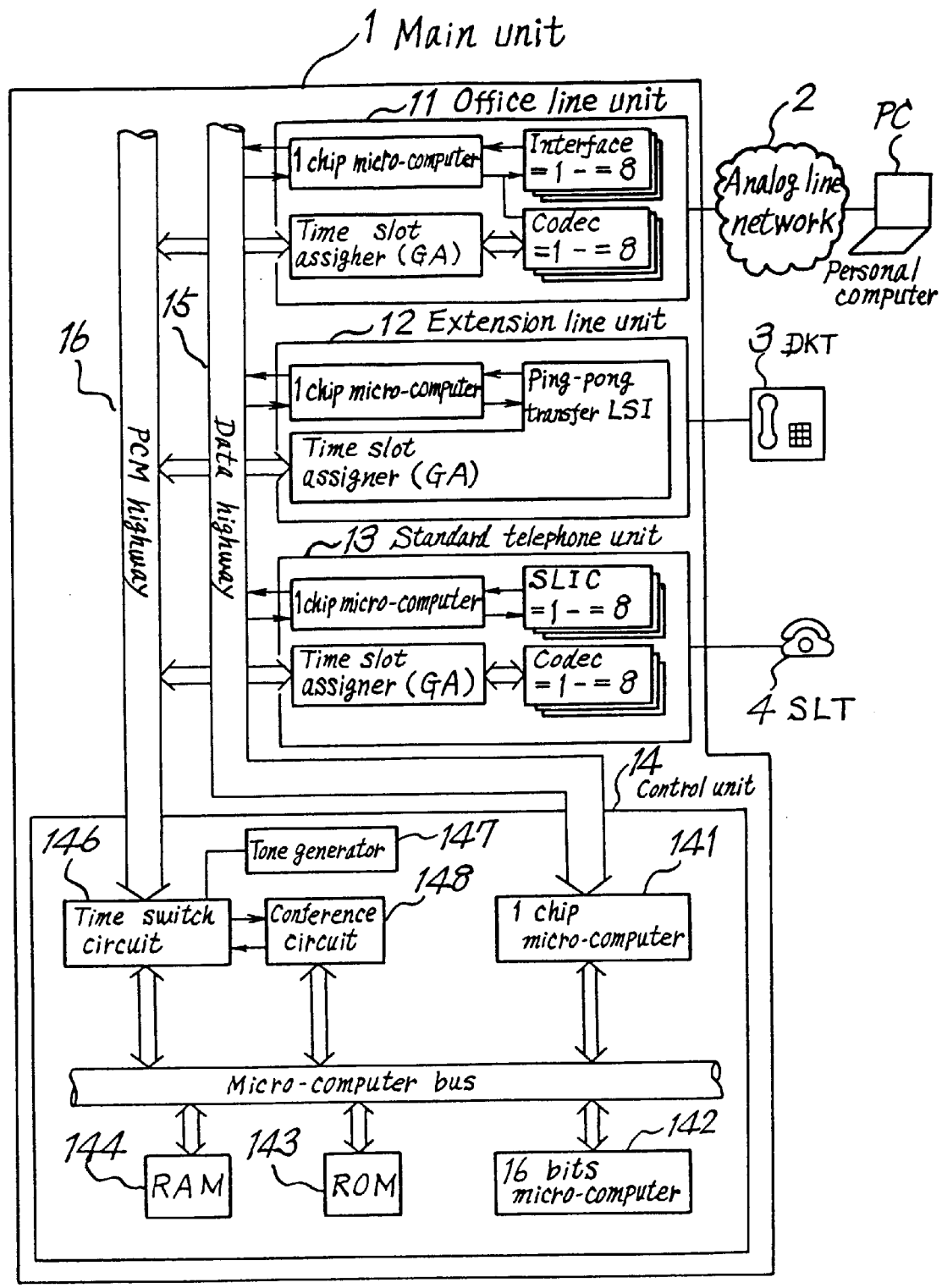
FIG. 16 is a block diagram of a key telephone system of the present invention.

Personal computer PC may be connected by using analog line network as shown in FIG. 16.

According to the present embodiment, the receiving mode for every DKT 3 can be set by a personal computer PC.

What is claimed is:

1. A key telephone system having a plurality of key telephone sets, comprising:

at least one key telephone set that has an extension number which is assigned to the at least one key telephone and a pseudo extension number which is shared with the other key telephone sets; and a tone generator for sending a busy tone to a third party, when the key telephone set using the pseudo extension number receives a call from the third party on the extension number.

2. A key telephone system as claimed in claim 1, further comprising:

a maintenance terminal for inputting data to send the busy tone in a memory of the key telephone system.

3. A key telephone system as claimed in claim 1, further comprising:

an inputting means in the key telephone set for inputting data to send the busy tone in a memory of the key telephone system.

4. A key telephone system as claimed in claim 1, further comprising:

a terminal connected to the key telephone set for inputting data to send the busy tone in a memory of the key telephone system.

5. A key telephone system as claimed in claim 1, further comprising:

a setting means for setting data for sending the busy tone in a memory, before receiving the call from the third party.

6. A key telephone system as claimed in claim 1, further comprising:

a setting means for setting data for sending the busy tone in a memory, when the call from the third party is received.

7. A key telephone system having a plurality of key telephone sets, comprising:

at least one key telephone set which has an extension number which is assigned to the at least one key telephone and a pseudo extension number which is shared with the other key telephone sets;

a voice message means for sending a voice message to a third party, when the key telephone set using the pseudo extension number receives a call from the third party on the extension number; and a setting means for setting data for sending the voice message in a memory in the key telephone system.

8. A key telephone system as claimed in claim 7, wherein the setting means for setting data for sending the voice message in the memory, before the call from the third party is received.

9. A key telephone system as claimed in claim 7, wherein the setting means for setting data for sending the voice message in the memory, when the key telephone set using the pseudo extension number receives the call from the third party on the extension number.

10. A key telephone system having a plurality of key telephone sets, comprising:

at least one key telephone set which has an extension number which is assigned to the at least one key telephone and a pseudo extension number which is shared with the other key telephone sets;

a recorder for recording a message of a third party, when the key telephone set using the pseudo extension number receives a call from the third party on the extension number; and a setting means for setting data for recording the message of the third party.

11. A key telephone system as claimed in claim 10, wherein the setting means for setting data for recording the message of the third party, before the call from the third party is received.

12. A key telephone system as claimed in claim 10, wherein the setting means for setting data for recording the message of the third party, when the call from the third party is received.

13. A key telephone system having a plurality of key telephone sets, comprising:

at least one key telephone set which has an extension number which is assigned to the at least one key telephone and a pseudo extension number which is shared with the other key telephone sets; and an indicator for indicating whether data, for sending a busy tone to a third party when the key telephone set using the pseudo extension number receives a call from the third party on the extension number, is set.

14. A key telephone system as claimed in claim 13, wherein the data is set by a letter.

15. A key telephone system as claimed in claim 13, wherein the data is set by light.

16. A key telephone system having a plurality of key telephone sets, comprising:

at least one key telephone set which has an extension number which is assigned to the at least one key telephone and a pseudo extension number which is shared with the other key telephone sets;

a tone generator for sending a busy tone to a third party, when the key telephone set using the pseudo extension number receives a call from the third party on the extension number;

an indicator for indicating that the call is received.

17. A key telephone system as claimed in claim 16, wherein the indicator indicates the telephone number of the third party.

18. A key telephone system having a plurality of key telephone sets, comprising:

at least one key telephone set which has an extension number which is assigned to the at least one key telephone and a pseudo extension number which is shared with the other key telephone sets;

a tone generator for sending a busy tone to a third party, when the key telephone set using the pseudo extension number receives a call from the third party on the extension number; and a setting means for setting data for sending the busy tone for a plurality of telephone numbers of a plurality of the third parties in a memory.

19. A key telephone system having a plurality of key telephone sets, comprising:

at least one key telephone set which has an extension number which is assigned to the at least one key telephone and a pseudo extension number which is shared with the other key telephone sets;

a tone generator for sending a busy tone to a third party, when the key telephone set using the pseudo extension number receives a call from the third party on the extension number; and a setting means for setting a priority of telephone numbers of calling parties in a memory.

20. A key telephone system having a plurality of key telephone sets, comprising:

at least one key telephone set which has a plurality of telephone numbers;

a tone generator for sending a busy tone to a third party, when the key telephone set using a first telephone number receives a call from the third party on a second telephone number; and a setting means, which is included in the at least one key telephone set, for setting data to send the busy tone in a memory.

21. A key telephone system as claimed in claim 20, wherein the setting means for setting data to send the busy tone in a memory, before the call from the third party is received.

22. A key telephone system as claimed in claim 20, wherein the setting means for setting data to send the busy tone in a memory, when the key telephone set using the pseudo extension number receives the call from the third party on the extension number.

23. A process for receiving a telephone call on either an extension number or a pseudo extension number in a key telephone system, comprising:

first step for judging whether the extension number which is a destination of the telephone call is idle, and if the extension number is busy, sending a busy tone to a calling party of the telephone call; and second step for judging whether the pseudo extension number is busy, sending the busy tone to the calling party.

24. A key telephone system having a plurality of key telephone sets, comprising:

at least one key telephone set which has a plurality of telephone numbers;

a tone generator for sending a busy tone to a third party, when the key telephone set using a first telephone number receives a call from the third party on a second telephone number; and a setting means for setting data to send the busy tone in a memory.

25. A key telephone system as claimed in claim 24, wherein the setting means is included in a maintenance terminal which is connected to a main unit.

26. A key telephone system as claimed in claim 24, wherein the setting means is included in a personal computer which is connected to a main unit.

27. A key telephone system as claimed in claim 24, wherein the setting means is included in a personal computer which is connected to a main unit through a line network.

28. A key telephone system having a plurality of key telephone sets, comprising:

at least one key telephone set which has a plurality of telephones numbers;

a switch for deciding whether the key telephone system sends a busy tone to a third party when the key telephone set using a first telephone number receives a call from the third part on a second telephone number; and a tone generator for sending the busy tone to a third party.

29. A key telephone system as claimed in claim 28, wherein the switch is included in a maintenance terminal which connected to a main unit.

30. A key telephone system as claimed in claim 28, wherein the switch is included in a personal computer which is connected to a main unit.

31. A key telephone system as claimed in claim 28, wherein the switch is included in a personal computer which is connected to a main unit through a line network.

* * * * *